United States Patent
Kuhm et al.

(10) Patent No.: US 11,001,312 B2
(45) Date of Patent: May 11, 2021

(54) ADAPTABLE SEALING HOLE PLUG

(71) Applicant: ILLINOIS TOOL WORKS INC., Glenview, IL (US)

(72) Inventors: Michel Kuhm, Ingwiller (FR); Stephane Dorschner, Weiterswiller (FR)

(73) Assignee: Illinois Tool Works Inc., Glenview, IL (US)

( * ) Notice: Subject to any disclaimer, the term of this patent is extended or adjusted under 35 U.S.C. 154(b) by 127 days.

(21) Appl. No.: 16/464,479

(22) PCT Filed: Oct. 27, 2017

(86) PCT No.: PCT/US2017/058675
§ 371 (c)(1),
(2) Date: May 28, 2019

(87) PCT Pub. No.: WO2018/102060
PCT Pub. Date: Jun. 7, 2018

(65) Prior Publication Data
US 2019/0308671 A1     Oct. 10, 2019

Related U.S. Application Data

(60) Provisional application No. 62/428,612, filed on Dec. 1, 2016.

(51) Int. Cl.
*B62D 25/24* (2006.01)
*B60J 10/16* (2016.01)
(Continued)

(52) U.S. Cl.
CPC .............. *B62D 25/24* (2013.01); *B60J 10/16* (2016.02); *B60J 10/23* (2016.02); *F16J 15/02* (2013.01)

(58) Field of Classification Search
CPC ... B62D 25/04; B62D 25/24; Y10T 24/44026; Y10T 24/309
(Continued)

(56) References Cited

U.S. PATENT DOCUMENTS 4,801,040 A *  1/1989  Kraus ................... B62D 25/24
                                                  220/787
5,505,324 A *  4/1996  Danico ................. B62D 25/24
                                                  220/201

(Continued)

FOREIGN PATENT DOCUMENTS

CN      201538365 U     8/2010
DE      10303366 A1     8/2004
(Continued)

OTHER PUBLICATIONS

International Search Report for PCT/US2017/058675, dated Feb. 9, 2018.

*Primary Examiner* — Dennis H Pedder
(74) *Attorney, Agent, or Firm* — Quarles & Brady LLP

(57) ABSTRACT

A hole plug is configured to plug a hole of a component, and includes a first lip that is configured to be positioned on a first surface of the component, and second lip that is configured to be positioned on a second surface of the component. The second surface is opposite from the first surface. At least one of the first lip or the second lip includes a first lip segment, a second lip segment, and at least one gap formed between the first lip segment and the second lip segment. The gap(s) is configured to allow the first lip segment and second lip segment to deflect and rotate relative to one another to adapt a size of the first lip and/or the second lip to the hole of the component.

18 Claims, 3 Drawing Sheets

(51) Int. Cl.
*B60J 10/23* (2016.01)
*F16J 15/02* (2006.01)

(58) Field of Classification Search
USPC ............... 296/1.06; 220/233, 234, 387, 287
See application file for complete search history.

(56) References Cited

U.S. PATENT DOCUMENTS 7,390,043 B2 * 6/2008 Kraus ................... B62D 25/24
215/355
9,676,425 B2 6/2017 Kanie et al.

FOREIGN PATENT DOCUMENTS

| EP | 0911132 A2 | 4/1999 |
| EP | 2377748 A1 | 10/2011 |
| EP | 3061675 A1 | 8/2016 |

\* cited by examiner

ADAPTABLE SEALING HOLE PLUG

RELATED APPLICATIONS

This application represents the United States National Stage of International Application No. PCT/US2017/058675, filed Oct. 27, 2017, which claims priority to U.S. Provisional Patent Application No. 62/428,612, entitled "Sealing Hole Plug," filed Dec. 1, 2016, which are hereby incorporated by reference in their entirety.

FIELD OF EMBODIMENTS OF THE DISCLOSURE

Embodiments of the present disclosure generally relate to hole plugs, and, more particularly, to hole plugs that are configured to be inserted into holes of components of different sizes.

BACKGROUND

Various assemblies include panels, blocks, or other such components connected to one another. Automobile assemblies, for example, include various panels and structures connected to other panels or structures, or to an automobile frame.

Certain components, such as blocks and panels, have holes formed therein. During an assembly process, the holes may receive and retain fasteners, or allow tubing, wiring, or the like to pass therethrough. In some instances, however, a hole may not be utilized. Similarly, the hole may be reserved for a future application, for example.

Hole plugs are often used to securely cover and close holes formed within panels of a device. A typical hole plug is formed of a resilient material, such as rubber, that allows the hole plug to flex, while at the same time providing a fluid-tight barrier.

EP 3061675, DE 10303366, and EP 0911132 disclose plugs. U.S. Pat. No. 9,676,425 discloses an expandable hole plug assembly.

A typical hole plug is sized and shaped to plug a hole of a particular size. The hole plug is generally too large to fit into smaller diameter holes, and too small to effectively plug larger diameter holes. Moreover, known hole plugs are sealed to components via an adhesive (such as glue) on both sides of the component (such as a metal frame). As such, an additional sealing step is used to ensure that the hole plug seals to a component.

SUMMARY OF EMBODIMENTS OF THE DISCLOSURE

A need exists for a hole plug that may be be used with a variety of hole sizes. Further, a need exists for a hole plug that may sealingly engage a component without a need for an additional outer sealing step.

With those needs in mind, certain embodiments of the present disclosure provide a hole plug that is configured to plug a hole of a component. The hole plug includes a first lip that is configured to be positioned on a first surface of the component, and second lip that is configured to be positioned on a second surface of the component. The second surface is opposite from the first surface. At least one of the first lip or the second lip includes a first lip segment, a second lip segment, and at least one gap formed between the first lip segment and the second lip segment. The gap(s) is configured to allow the first lip segment and second lip segment to deflect and rotate relative to one another to adapt a size of the first lip and/or the second lip to the hole of the component. In at least one embodiment, first and second gaps are formed between the first lip segment and the second lip segment In at least one embodiment, the hole plug also includes a sealing core positioned within an internal chamber between the first lip and the second lip. The sealing core is configured to expand and close the gap(s) and securely seal the first lip segment to the second lip segment. The sealing core may be formed of a polyurethane foam, a urethane foam, a two part closed cell foam, an expandable resin, and/or the like.

Only of the first lip or the second lip may include the first and second lip segments. In at least one other embodiment, each of the first lip and the second lip may include first and second lip segments.

The hole plug may include a central column that connects a cover of the first lip to a cap of the second lip. In at least one embodiment, the sealing core is positioned around the central column.

Portions of the first lip segment and the second lip segment may overlap one another. A first axial center of the first lip segment may be offset from a second axial center of the second lip segment. In at least one embodiment, each of the first and second lip segments spans at least 180 radial degrees.

Figure 1:
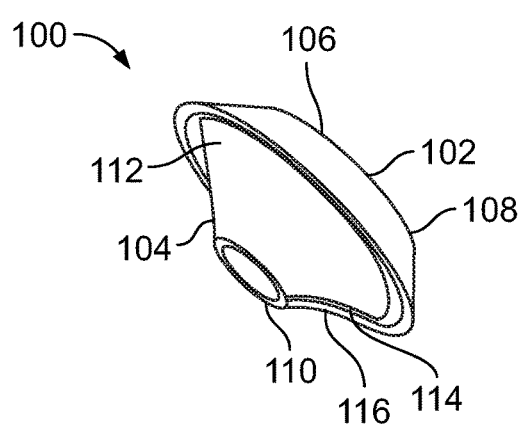
FIG. 1 illustrates a perspective bottom view of a hole plug, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a hole plug that is configured to be used with a variety of hole sizes. In at least one embodiment, the hole plug includes an integral sealing member that is configured to provide a sealing interface with a component, such as a panel, frame, or other such structure.

The hole plug includes at least one resilient lip. At least one of the lips, such as a bottom lip, includes lip segments separated by plurality of gaps or slots (such as two gaps). Portions of the lip segments overlap one another.

In at least one embodiment, the hole plug also includes an expandable sealing member. As the sealing member expands, portions of the lip segments proximate to a gap are urged together and ensure a sealing engagement with a component. The slotted lip allows the lip to be rotated during assembly into small diameter holes, and allows for low insertion forces. The expandable member assures that gaps are closed for holes having larger diameters.

The hole plug is configured to be used with holes of different sizes and shapes. As such, the hole plug is able to be used in place of variety of different hole plugs that are otherwise used to fit into specific sized holes.

FIG. 1 illustrates a perspective bottom view of a hole plug 100, according to an embodiment of the present disclosure. The hole plug 100 is formed of a resilient material, such as a rubber or another elastomeric material. The hole plug 100 includes a first plugging member, such as a first or top lip 102, coupled to a second plugging member, such as a second or bottom lip 104. The first lip 102 includes a cover 106 connected to a circumferential wall 108 that outwardly and radially expands from the cover 106 towards the second lip 104. The second lip 104 includes a cap 110 and first and second lip segments 112 and 114 having portions that are separated by gaps 116. The first and second lip segments 112 and 114 may provide conical wall portions that outwardly and radially expand from the cap 110 towards the first lip 102.

Figure 2:
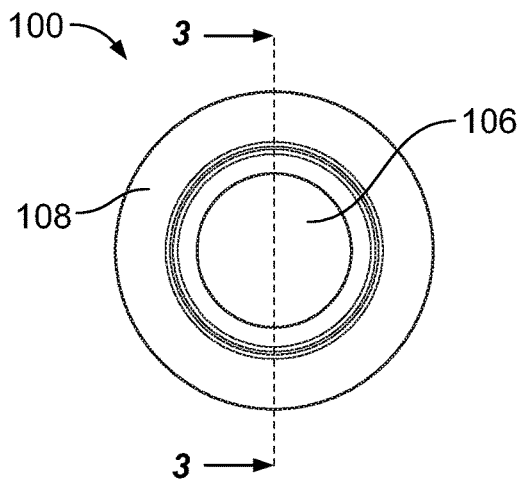
FIG. 2 illustrates a top view of a hole plug, according to an embodiment of the present disclosure.

FIG. 2 illustrates a top view of the hole plug 100. As shown, the first lip 102 includes the circumferential wall 108 radially extending from the cover 106. The wall 108 may be a contiguous structure devoid of any gaps, gaps, or openings. Optionally, the first lip 102 may be defined by lip segments, similar to the bottom lip 104.

Figure 3:
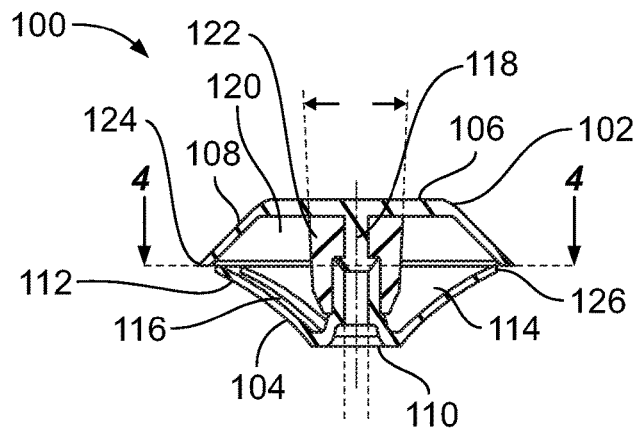
FIG. 3 illustrates a cross-sectional view of a hole plug through line 3-3 of FIG. 2, according to an embodiment of the present disclosure.

FIG. 3 illustrates a cross-sectional view of the hole plug 100 through line 3-3 of FIG. 2. A central column 118 connects the cover 106 of the first lip 102 to the cap 110 of the second lip 104. An internal chamber 120 is defined within the hole plug 100 between the first lip 102 and the second lip 104. An expandable sealing core or member 122 is secured within the internal chamber 120. For example, the sealing core 122 is secured around the central column 118 between the cover 106 of the first lip 102 and the cap 110 of the second lip 104. In an unexpanded state, the sealing core 122 may occupy more or less space within the internal chamber 120 than shown.

Distal edges 124 of the wall 108 of the first lip 102 are free and exposed. Similarly, distal edges 126 of the lip segments 112 and 114 of the second lip 104 are free and exposed. That is, the distal edges 124 and the distal edges 126 are not directly connected together. In this manner, a component is configured to be sandwiched between the first lip 102 and the second lip 104.

The gaps 116 may separate the lip segments 112 and 114 from one another. The gaps 116 may extend through and from the distal edges 126 to the cap 110 of the second lip 104. The gaps 116 may not entirely extend into the cap 110. In this manner, the lip segments 112 and 114 are anchored together through the cap 110.

Figure 4:
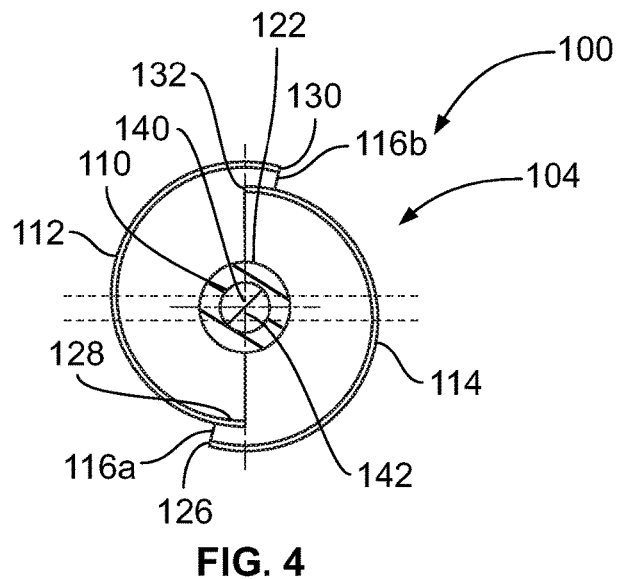
FIG. 4 illustrates a cross-sectional view of a hole plug through line 4-4 of FIG. 3, according to an embodiment of the present disclosure.

FIG. 4 illustrates a cross-sectional view of the hole plug 100 through line 4-4 of FIG. 3. The lip segments 112 and 114 connect to one another at the cap 110. The gap 116a separates an outer end portion 126 of the lip segment 114 from an inner end portion 128 of the lip segment 112, while the gap 116b separates an outer end portion 130 of the lip segment 112 from an inner end portion 132 of the lip segment 114. While separated by the gap 116a, the outer end portion 126 of the lip segment 114 radially overlaps the inner end portion 128 of the lip segment 112. Similarly, while separated by the gap 116b, the outer end portion 130 of the lip segment 112 radially overlaps the inner end portion 132 of the lip segment 114.

The axial centers 140 and 142 of the lip segments 112 and 114, respectively, may be offset with respect to one another. That is, the axial centers 140 and 142 are not coaxial. By offsetting the axial centers 140 and 142, portions of the lip segments 112 and 114 overlap one another and separated by the gaps 116a and 116b, as described herein.

As shown, the second lip 104 includes the two lip segments 112 and 114, each of which may generally be approximately a half radial portion of the bottom lip 104. For example, each lip segment 112 and 114 may span approximately 180 radial degrees. Optionally, one lip segment 112 or 114 may span a greater radial range than the other lip segment 112 or 114. In at least one other embodiment, the second lip 104 may include more than two lip segments. For example, the second lip 104 may include three lip segments, each of which may span approximately 120 radial degrees.

Figure 5:
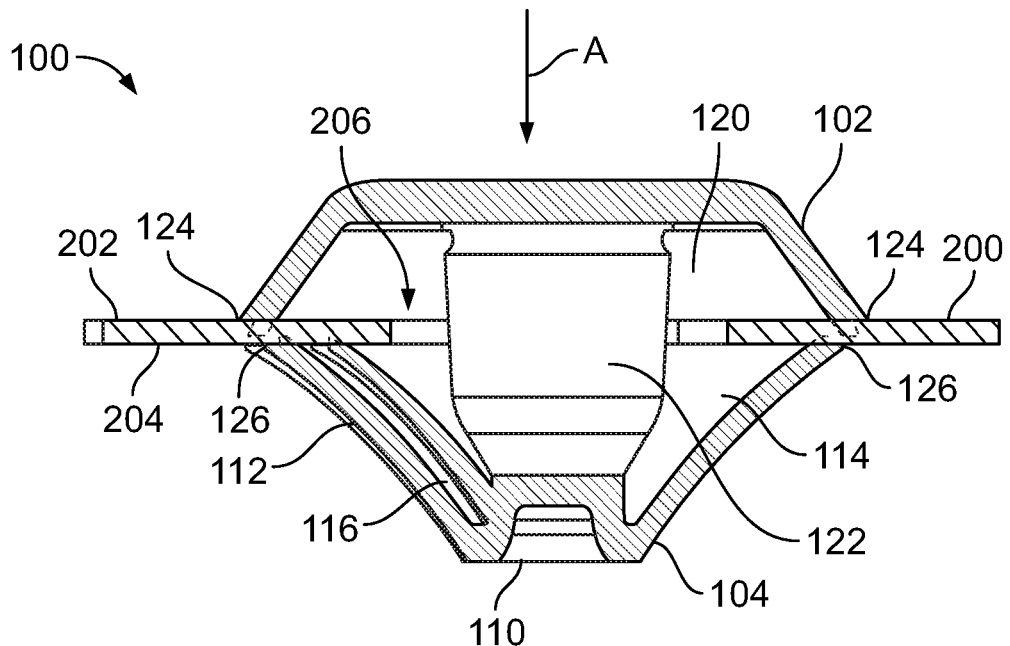
FIG. 5 illustrates a lateral internal view of a hole plug secured to a component, according to an embodiment of the present disclosure.

FIG. 5 illustrates a lateral internal view of the hole plug 100 secured to a component 200 (such as a panel), according to an embodiment of the present disclosure. The distal edges 124 of the first lip 102 engage a first surface 202 of the component 200, while the distal edges 126 of the second lip 104 engage a second surface 204 of the component 200 that that is opposite from the first surface 202.

In order to secure the hole plug 100 to the component 200, the cap 110 of the second lip 104 may be axially aligned with a hole 206 formed through the component 200. The hole plug 100 is then urged into the hole 206. As the hole plug 100 is urged into the hole 206, the lip segments 112 and 114 inwardly deflect to pass into and through the hole 206. As the second lip 104 passes out of the hole 206, the lip segments 112 and 114 deflect back to at-rest positions, and the component 200 is trapped between the first lip 102 and the second lip 104.

When the hole plug 100 is secured to the component 200, as shown in FIG. 5, the sealing core 122 extends through the hole 206. The sealing core 122 is configured to expand when heated, for example, to sealingly fill the hole 206 and the internal chamber 120 of the hole plug 100. Alternatively, the hole plug 100 may not include the sealing core 122.

Figure 6:
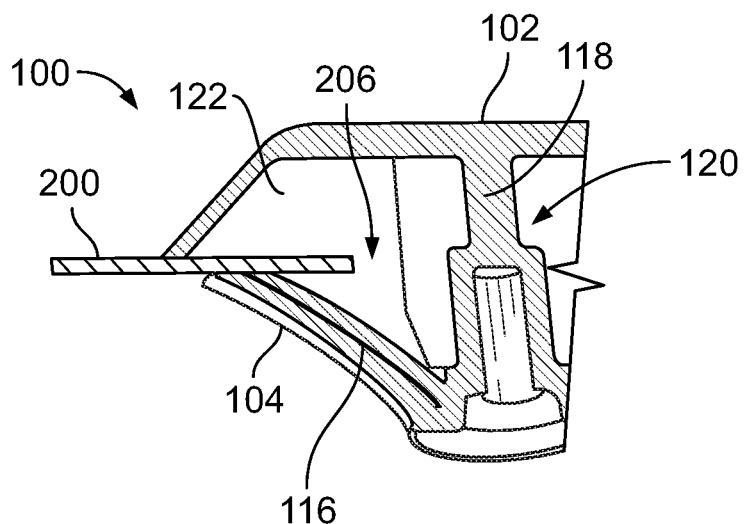
FIG. 6 illustrates a partial lateral internal view of a hole plug secured to a component with an expanded sealing member filling an internal chamber, according to an embodiment of the present disclosure.

FIG. 6 illustrates a partial lateral internal view of the hole plug 100 secured to the component 200 with an expanded sealing core 122 filling the internal chamber 120, according to an embodiment of the present disclosure. Referring to FIGS. 5 and 6, the sealing core 122 is configured to expand during a heating process. For example, the sealing member may melt, and expand to fill space within the internal chamber 120 between the first lip 102 and the second lip 104. As the sealing core 122 expands, the gaps 116 are closed, as shown in FIG. 6, due to the expanding force of the sealing core 122 urging portions of the lip segments 112 and 114 into one another.

In at least one embodiment, the sealing core 122 is formed of a material that is configured to melt at a predetermined temperature and expand between the first lip 102 and the second lip 104. For example, the sealing core 122 may be formed of an adhesive, a closed or open celled foam, and/or the like. As further examples, the sealing core 122 may be formed of or otherwise include polyurethane foam, urethane foam, or two part closed cell foams that provide a water proof barrier. As another example, the sealing core 122 may formed of an expandable resin, or the like. In at least one embodiment, the sealing core 122 is heated at a temperature between 120°-180° Celsius to allow the sealing core 122 to deform (such as by melting), thereby allowing the sealing member to fill spaces within the internal chamber 120 between the first lip 102, the second lip 104, and the component 200.

Figure 7:
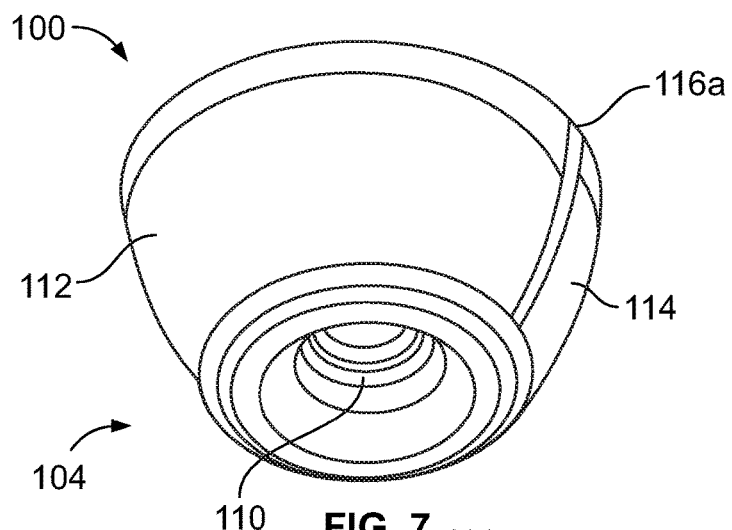
FIG. 7 illustrates a bottom perspective view of a second lip of a hole plug, according to an embodiment of the present disclosure.
Figure 8:
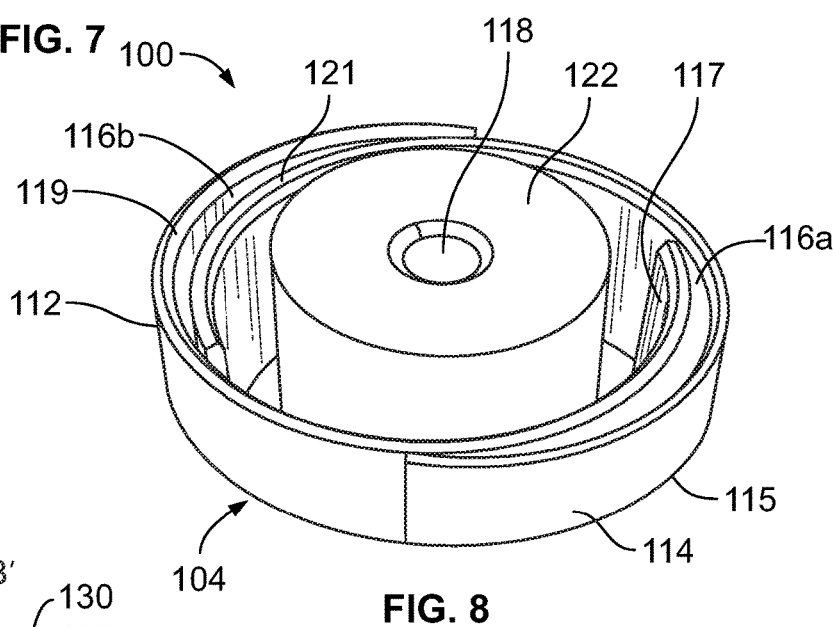
FIG. 8 illustrates a top internal view of a second lip of a hole plug, according to an embodiment of the present disclosure.
Figure 9:
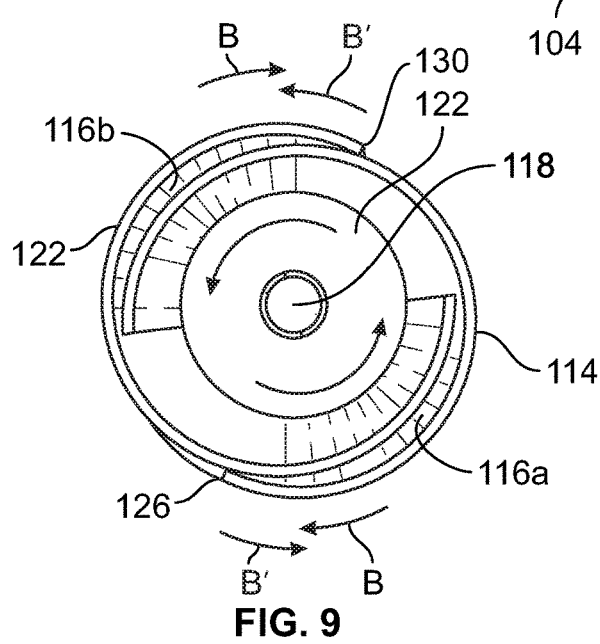
FIG. 9 illustrates a top internal view of a second lip of a hole plug, according to an embodiment of the present disclosure.

FIG. 7 illustrates a bottom perspective view of the second lip 104 of the hole plug 100, according to an embodiment of the present disclosure. FIG. 8 illustrates a top internal view of the second lip 104 of the hole plug 100. FIG. 9 illustrates a top internal view of the second lip 104 of the hole plug 100. Referring to FIGS. 7-9, the slots or gaps 116a and 116b are formed between portions of the lip segments 112 and 114. As shown in FIGS. 8 and 9, in particular, an outer portion 115 of the lip segment 114 is separated from an inner portion 117 the lip segment 112 by the gap 116a, while an outer portion 119 of the lip segment 112 is separated from an inner portion 121 of the lip segment 114 by the gap 116b. As such, the outer portion 115 of the lip segment 114 overlaps the inner portion 117 of the lip segment 112 (and separated by the gap 116a), while the outer portion 119 of the lip segment 112 overlaps the inner portion 121 of the lip segment 114 (and separated by the gap 116b).

The gaps 116a and 116b allow the second lip 104 to be inserted into holes having different diameters. For example, the gaps 116a and 116b allow the lip segments 112 and 114 to flex towards one another as the second lip 104 is pushed through the hole 206 of the component 200 (shown in FIGS. 5 and 6). As the sealing core 122 is heated and expands, the gaps 116a and 116b are closed, such as by the inner portions 117 and 121 being urged into the outer portions 115 and 119 by the expanding material of the sealing core 122, and/or by the expanding material of the sealing core 122 itself. For example, the pressure of the expanding sealing core 122 forces the inner portions 117 and 121 into the outer portions 115 and 119 to close the gaps 116a and 116b, and the sealing core 122 adhesively seals the inner portions 117 and 121 to the outer portions 115 and 119, thereby providing a fluid-tight seal therebetween.

Further, as shown in FIG. 9, in particular, the lip segments 112 and 114 may be rotated relative to one another about a central axis of the central column 118 in order to vary a diameter or width of the second lip 104. By radially rotating the outer ends 126 and 130 of the lip segments 114 and 112, respectively, towards one another in a clockwise manner in the direction of arcs B, the diameter of the second lip 104 may be decreased. Conversely, by radially rotating the outer ends 126 and 130 away from one another in a counter-clockwise manner in the direction of arcs B', the diameter of the second lip 104 may be increased. As such, the lip segments 112 and 114 allow the second lip 104 to adapt to various different sizes in order to be used with holes of components that differ in diameter or width.

Referring to FIGS. 1-9, the hole plug 100 is configured to be easily inserted into holes of components. The holes may be different sizes. The slotted second lip 104 allows the hole plug 100 to be inserted into holes of different sizes. Rotation of the lip segments 112 and 114 relative to one another as the hole plug 100 is inserted into a hole ensures a relatively low insertion force into the hole. Portions of the second lip 104 overlap. The lip segments 112 and 114 slide relative to one another during an assembly process to pass through the hole 206 and deploy on an opposite side of the component 200. The axial centers of the lip segments 112 and 114 of the slotted lip 104 may be offset in order to have portions of the lip segments 112 and 114 overlap one another. The expandable sealing core 122 ensures a robust seal to the component 200 between the first and second lips 102 and 104.

As described above, embodiments of the present disclosure provide an adaptable sealing hole plug 100. The hole plug 100 may include at least one slotted lip that is configured to fit hole diameters of different diameters (such as 12 mm-15 mm). The slotted lip allows the hole plug to fit within small hole diameters at a relatively low insertion force. An expandable member, such as a central sealing core allows for a secure and reliable seal, particularly for holes of increased sizes.

Embodiments of the present disclosure provide a hole plug that may be used with a variety of hole sizes. Further, the hole plug may sealingly engage a component without the need for an additional outer sealing step.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A hole plug that is configured to plug a hole of a component, the hole plug comprising:
   a first lip segment that is configured to be positioned on a first surface of the component; and
   second lip segment that is configured to be positioned on a second surface of the component, wherein the second surface is opposite from the first surface,
   wherein the second lip comprises:
      a first lip segment;
      a second lip segment; and
      at least one gap formed between the first lip segment and the second lip segment, wherein the at least one gap is configured to allow the first lip segment and second lip segment to deflect and rotate relative to one another to adapt a size of the at least one of the first lip or the second lip to the hole of the component,
      wherein at least a portion of the first lip segment and at least a portion of the second lip segment are each configured to engage the second surface of the component.

2. The hole plug of claim 1, wherein the at least one gap comprises a first gap and a second gap.

3. The hole plug of claim 1, further comprising a sealing core positioned within an internal chamber between the first lip and the second lip, wherein the sealing core is configured to expand and close the at least one gap and securely seal the first lip segment to the second lip segment.

4. The hole plug of claim 3, wherein the sealing core is formed of a polyurethane foam, a urethane foam, a two part closed cell foam, or an expandable resin.

5. The hole plug of claim 1, further comprising a central column that connects a cover of the first lip to a cap of the second lip.

6. The hole plug of claim 1, wherein portions of the first lip segment and the second lip segment overlap one another.

7. The hole plug of claim 1, wherein a first axial center of the first lip segment is offset from a second axial center of the second lip segment.

8. The hole plug of claim 1, wherein each of the first and second lip segments spans at least 180 radial degrees.

9. A hole plug that is configured to plug a hole of a component, the hole plug comprising:
   a first lip that is configured to be positioned on a first surface of the component;
   second lip that is configured to be positioned on a second surface of the component, wherein the second surface is opposite from the first surface, wherein the second lip comprises:
      a first lip segment;
      a second lip segment; and
      at least one gap formed between the first lip segment and the second lip segment, wherein the at least one gap is configured to allow the first lip segment and second lip segment to deflect and rotate relative to one another to adapt a size of the second lip to the hole of the component; and
   a sealing core positioned within an internal chamber between the first lip and the second lip, wherein the sealing core is configured to expand and close the at least one gap and securely seal the first lip segment to the second lip segment.

10. The hole plug of claim 9, wherein the at least one gap comprises a first gap and a second gap.

11. The hole plug of claim 9, wherein the sealing core is formed of a polyurethane foam, a urethane foam, a two part closed cell foam, or an expandable resin.

12. The hole plug of claim 9, further comprising a central column that connects a cover of the first lip to a cap of the second lip.

13. The hole plug of claim 12, wherein the sealing core is positioned around the central column.

14. The hole plug of claim 9, wherein portions of the first lip segment and the second lip segment overlap one another.

15. The hole plug of claim 9, wherein a first axial center of the first lip segment is offset from a second axial center of the second lip segment.

16. The hole plug of claim 9, wherein each of the first and second lip segments spans at least 180 radial degrees.

17. A hole plug that is configured to plug a hole of a component, the hole plug comprising:
   a first lip that is configured to be positioned on a first surface of the component;
   second lip that is configured to be positioned on a second surface of the component, wherein the second surface is opposite from the first surface, wherein the second lip comprises:
      a first lip segment;
      a second lip segment;
      a first gap formed between the first lip segment and the second lip segment; and
      a second gap formed between the first lip segment and the second lip segment, wherein the first gap and the second gap are configured to allow the first lip segment and second lip segment to deflect and rotate relative to one another to adapt a size of the second lip to the hole of the component, wherein a first axial center of the first lip segment is offset from a second axial center of the second lip segment, wherein portions of the first lip segment and the second lip segment overlap one another;
   a central column that connects a cover of the first lip to a cap of the second lip; and
   a sealing core positioned within an internal chamber between the first lip and the second lip, wherein the sealing core is positioned around the central column, and wherein the sealing core is configured to expand and close the first gap and the second gap and securely seal the first lip segment to the second lip segment.

18. The hole plug of claim 17, wherein the sealing core is formed of a polyurethane foam, a urethane foam, a two part closed cell foam, or an expandable resin.

* * * * *